Figure 1:
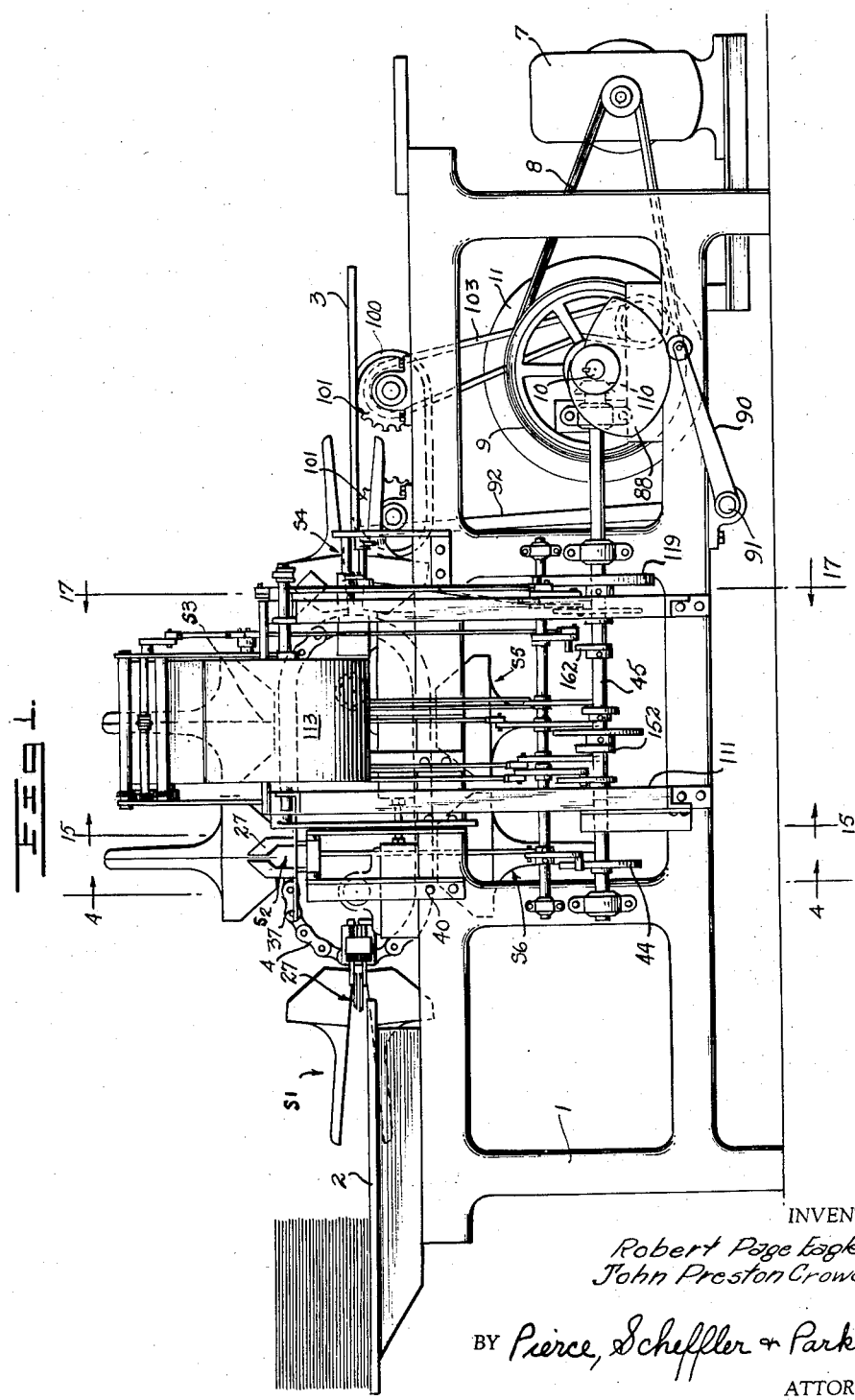

April 15, 1958 R. P. EAGLES ET AL 2,830,504
BAG VALVING AND SLEEVING MACHINE
Filed Jan. 7, 1953 18 Sheets-Sheet 1

INVENTOR
Robert Page Eagles
John Preston Crowder Jr.

BY Pierce, Scheffler & Parker
ATTORNEYS

April 15, 1958  R. P. EAGLES ET AL  2,830,504
BAG VALVING AND SLEEVING MACHINE

Filed Jan. 7, 1953  18 Sheets-Sheet 4

INVENTOR
Robert Page Eagles
John Preston Crowder Jr.

BY Pierce, Scheffler + Parker
ATTORNEYS

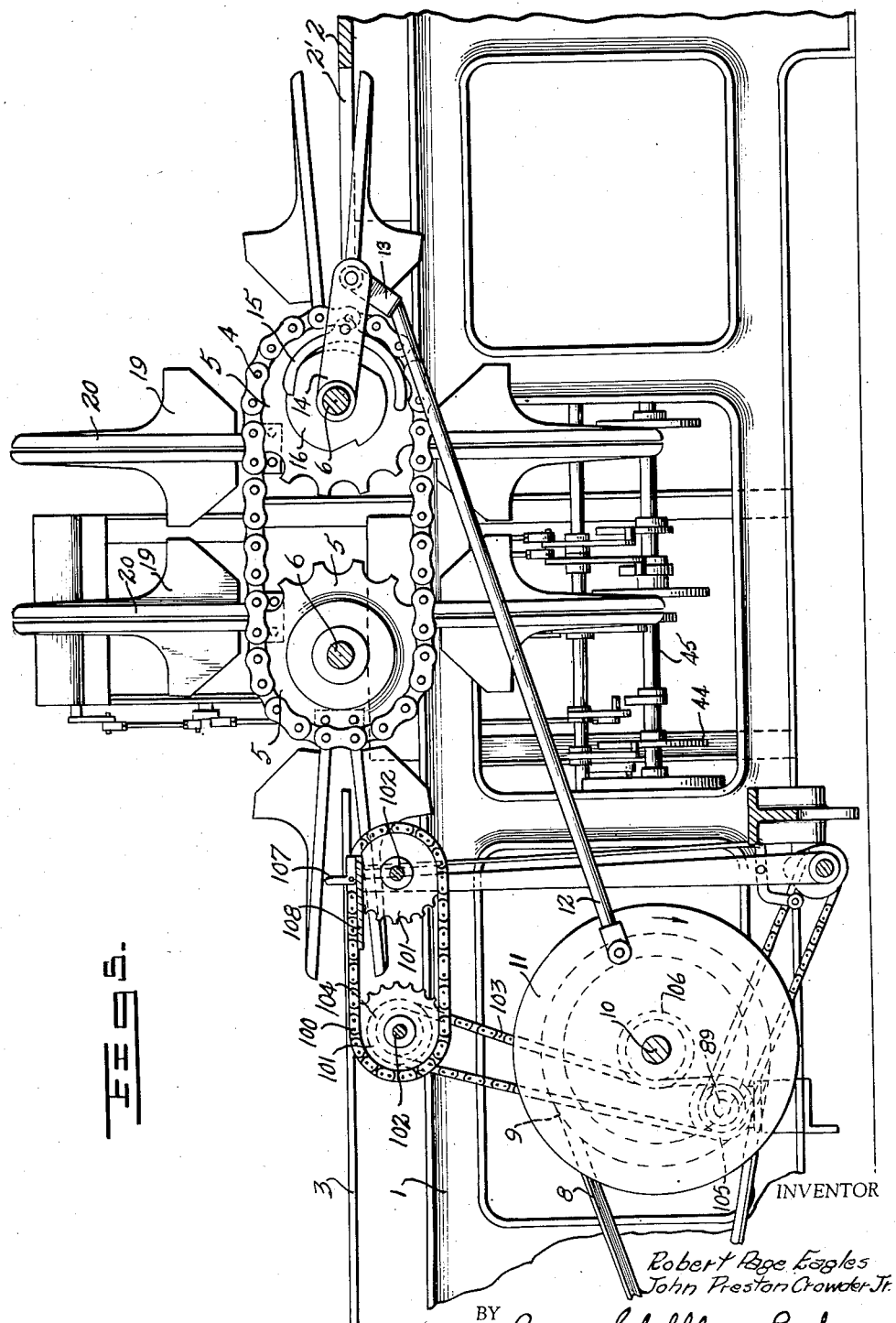

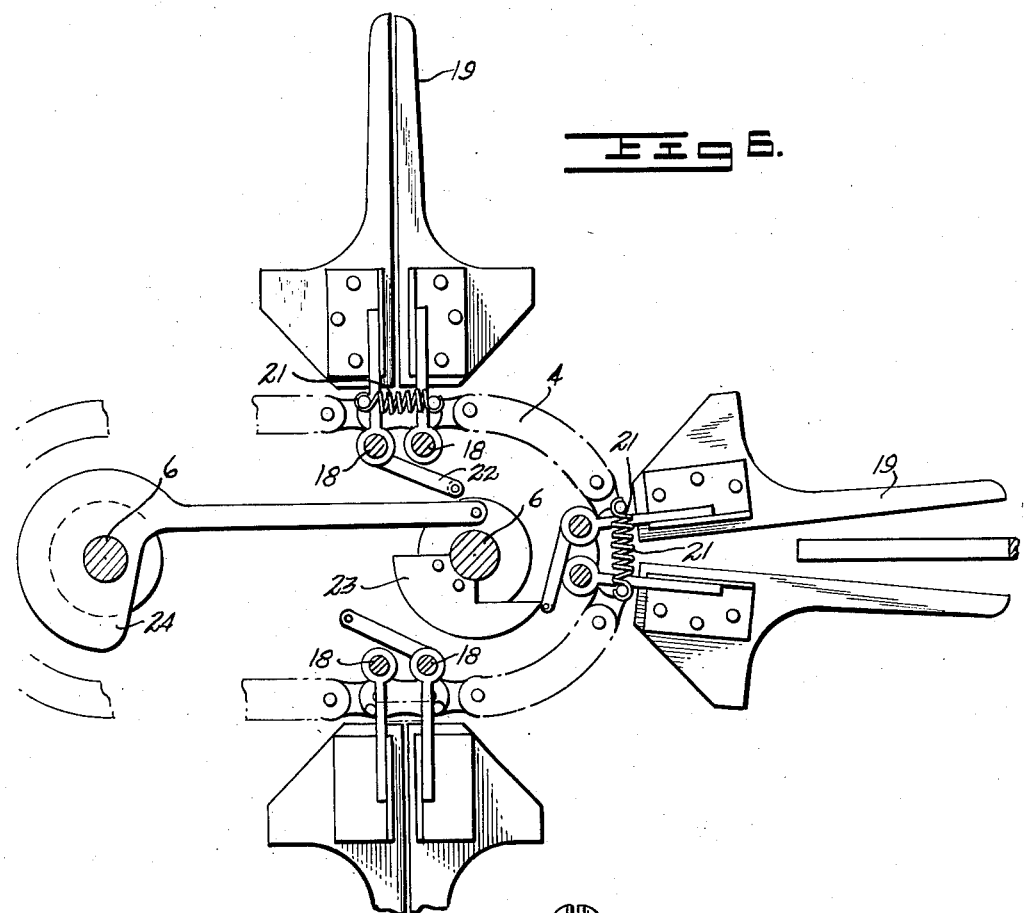
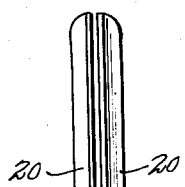
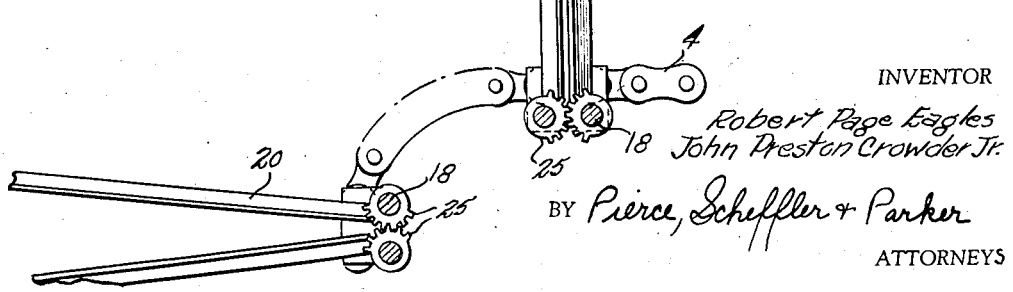

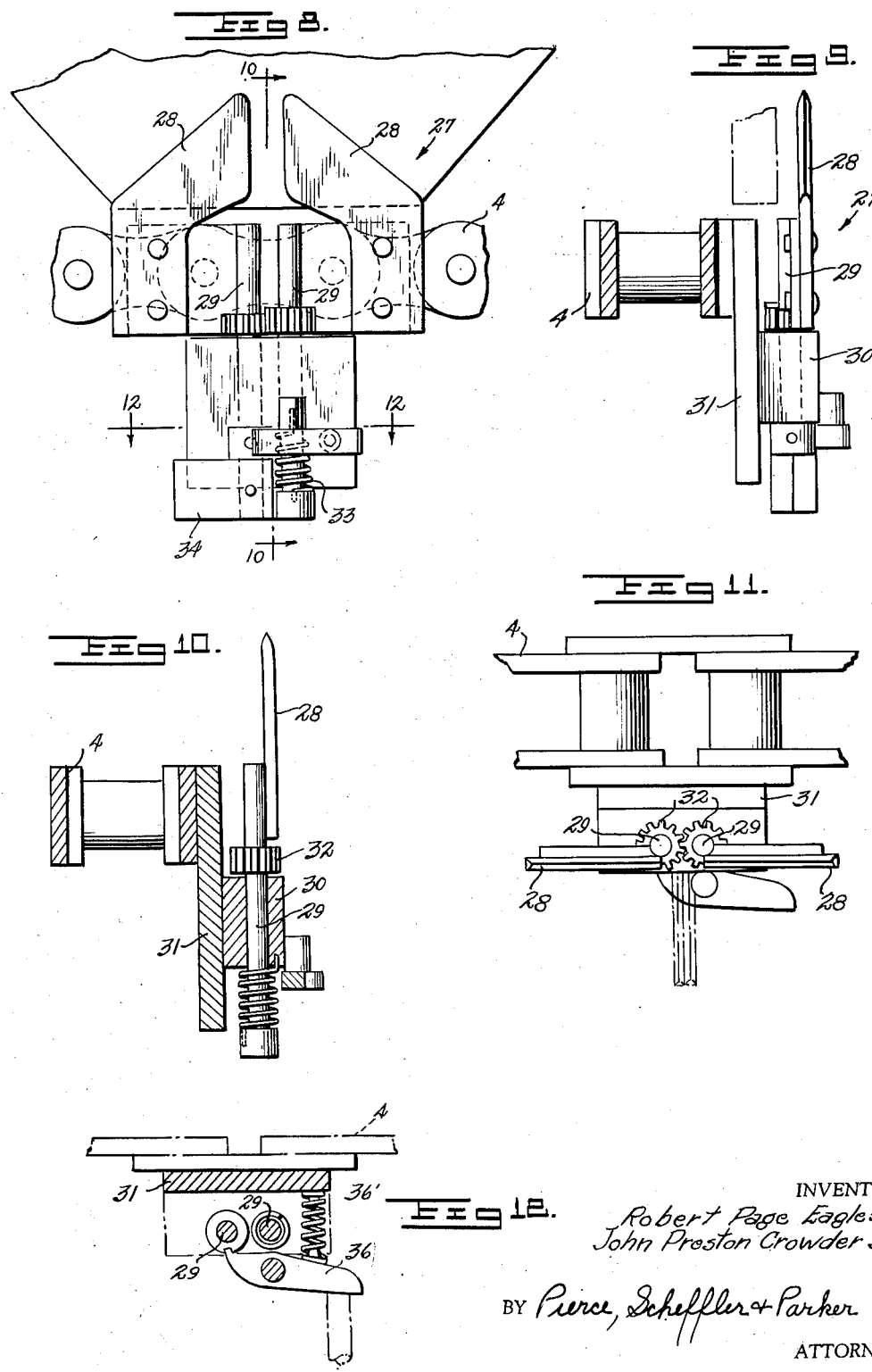

April 15, 1958   R. P. EAGLES ET AL   2,830,504
BAG VALVING AND SLEEVING MACHINE
Filed Jan. 7, 1953   18 Sheets-Sheet 8
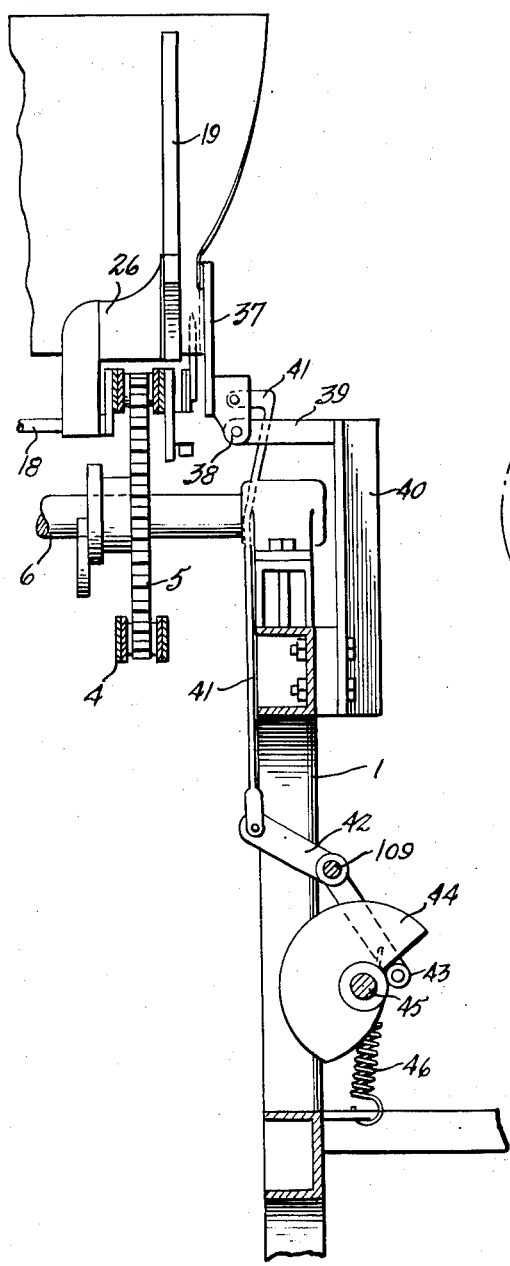
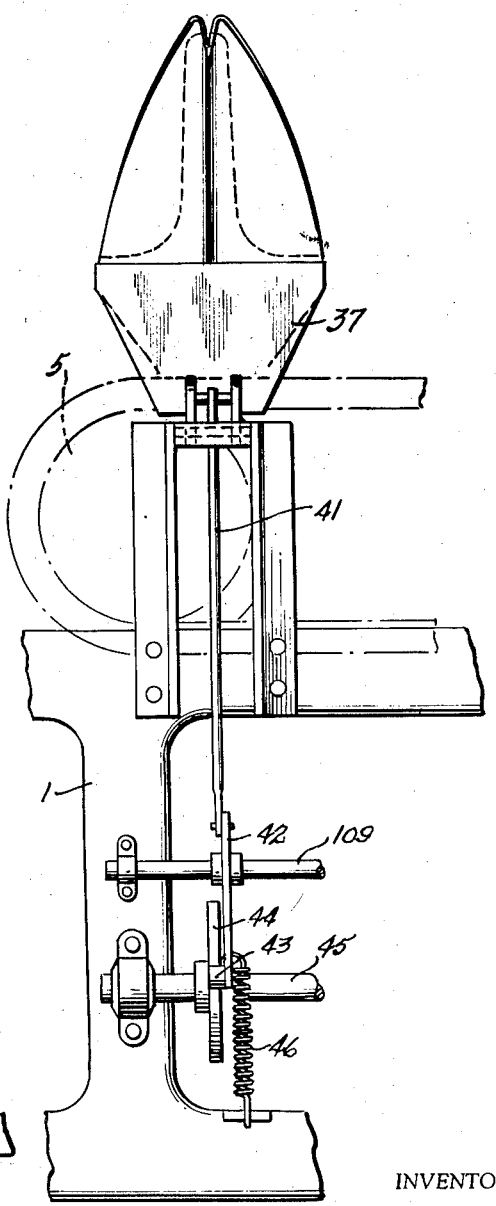
INVENTOR
Robert Page Eagles
John Preston Crowder Jr.
BY Pierce, Scheffler & Parker
ATTORNEYS

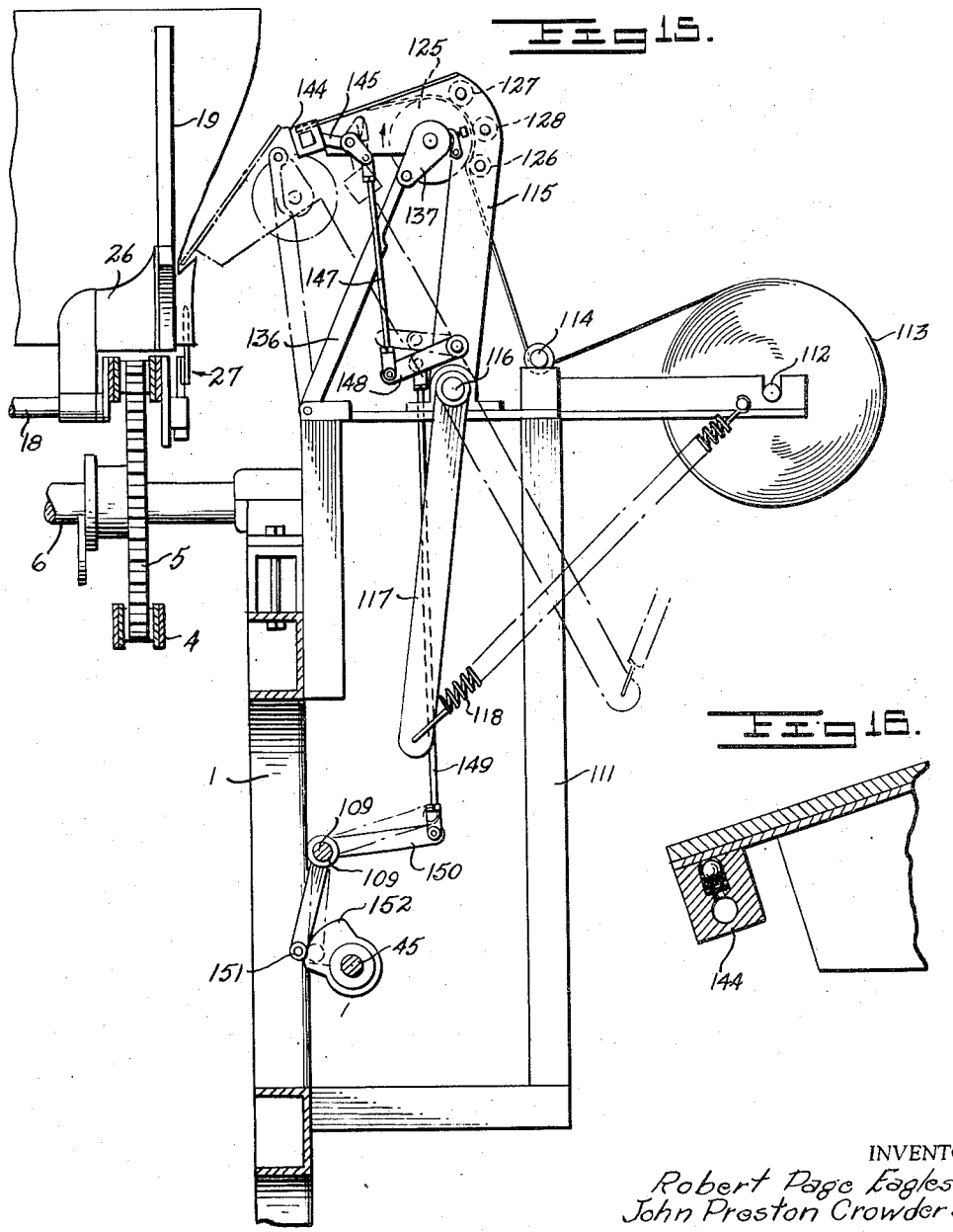

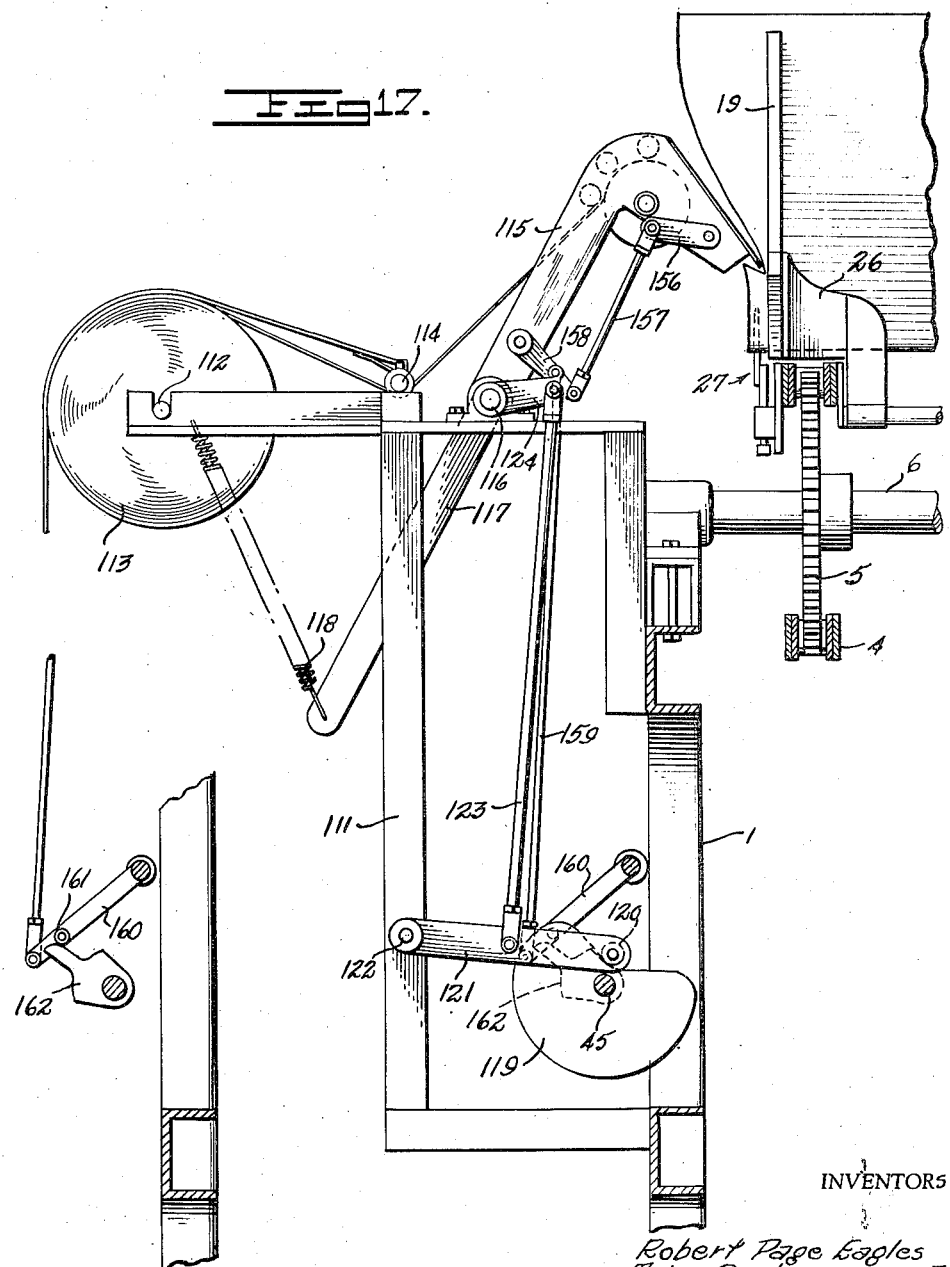

April 15, 1958   R. P. EAGLES ET AL   2,830,504
BAG VALVING AND SLEEVING MACHINE
Filed Jan. 7, 1953   18 Sheets-Sheet 11
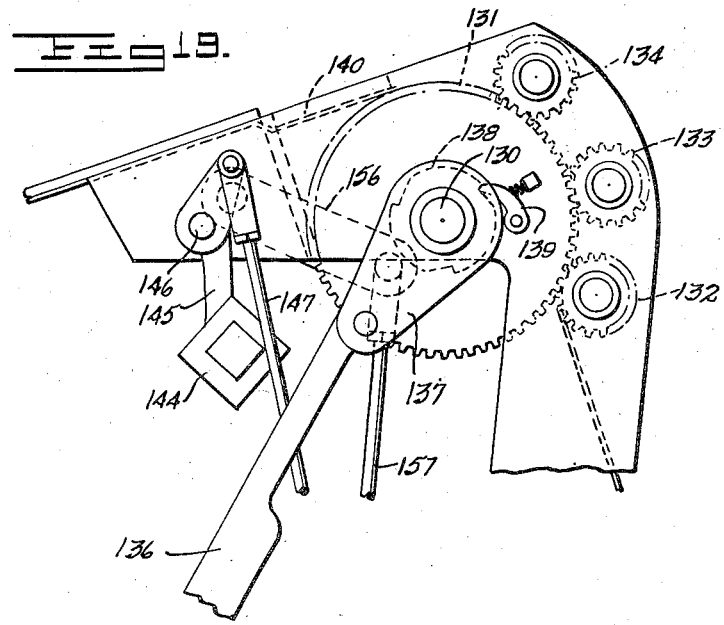
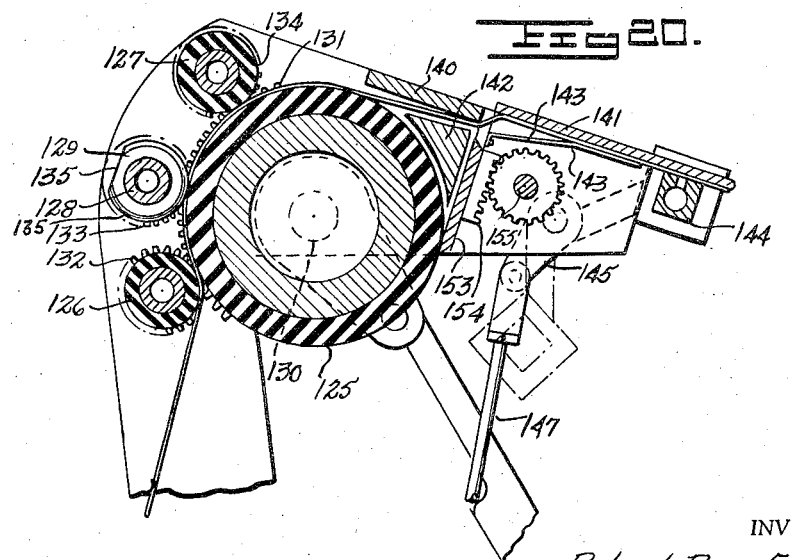
INVENTOR
Robert Page Eagles
John Preston Crowder Jr.
BY Pierce, Scheffler & Parker
ATTORNEYS

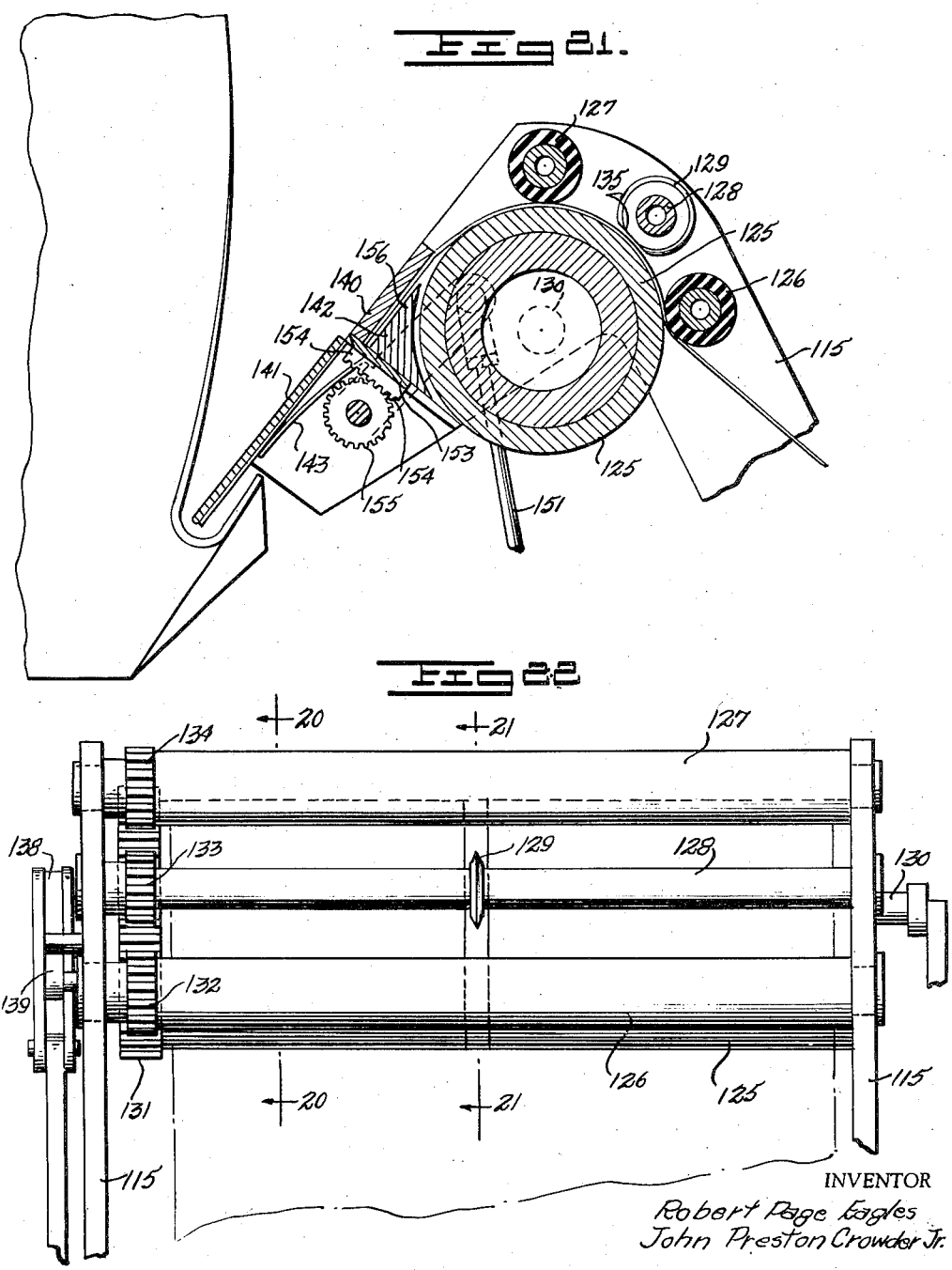

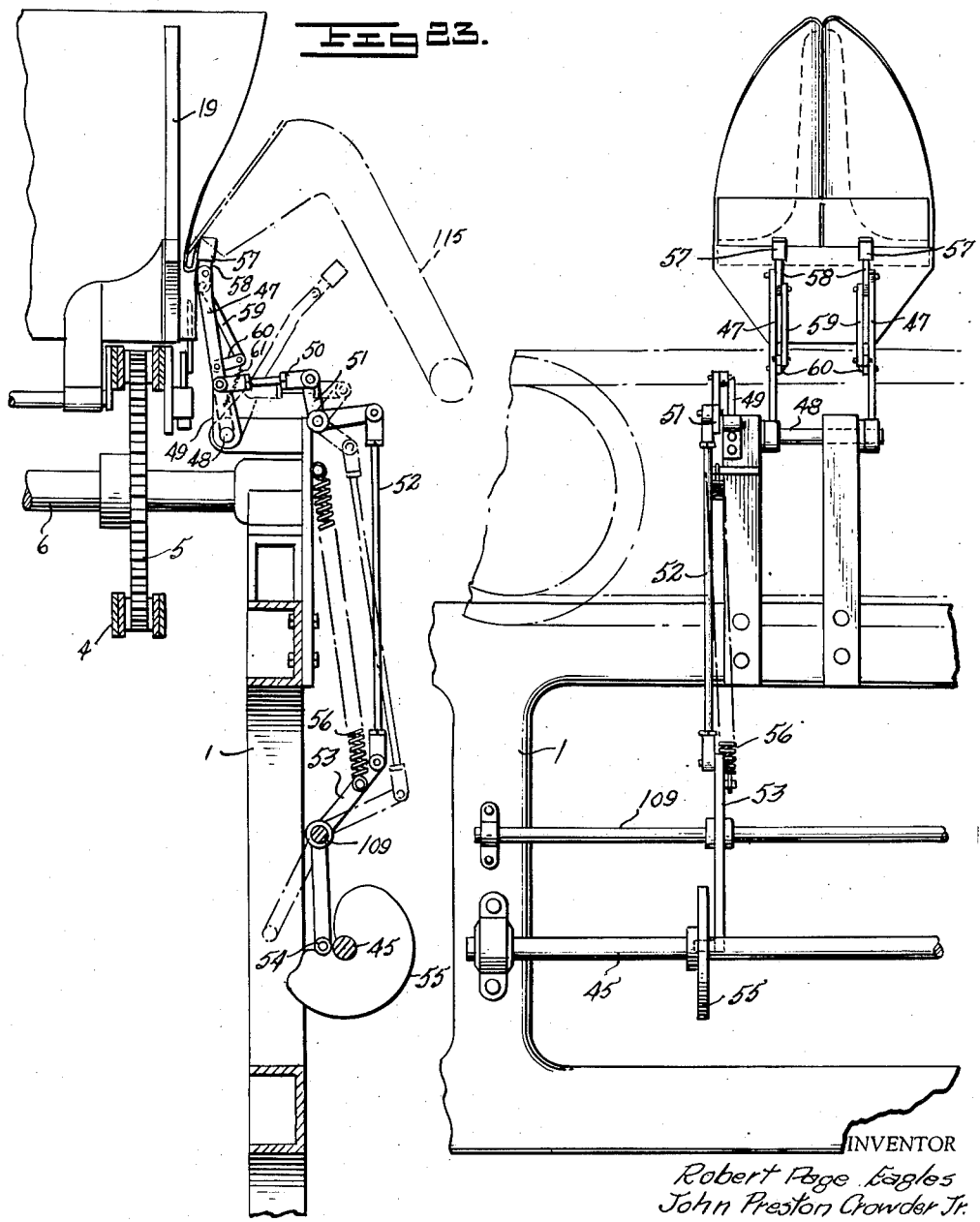

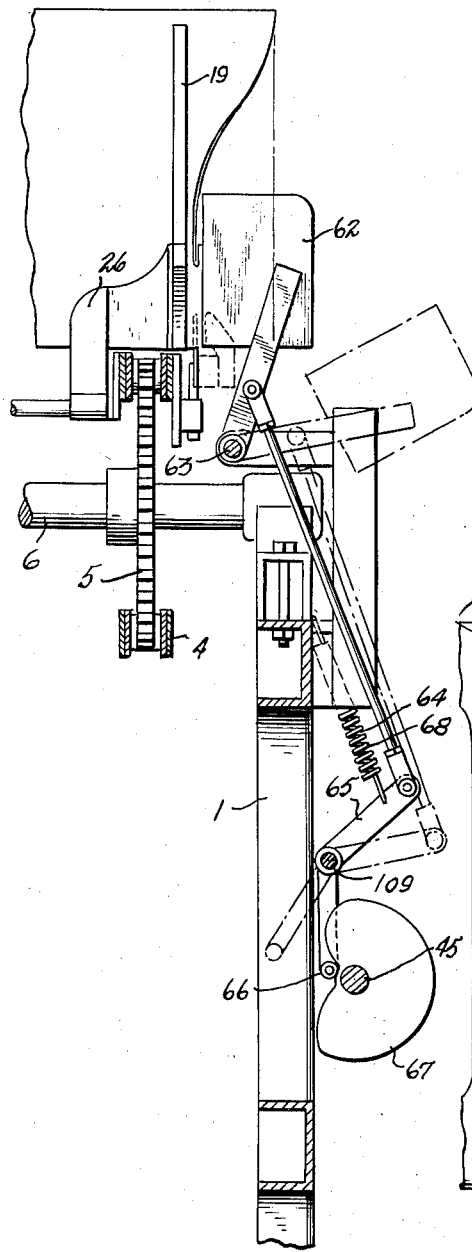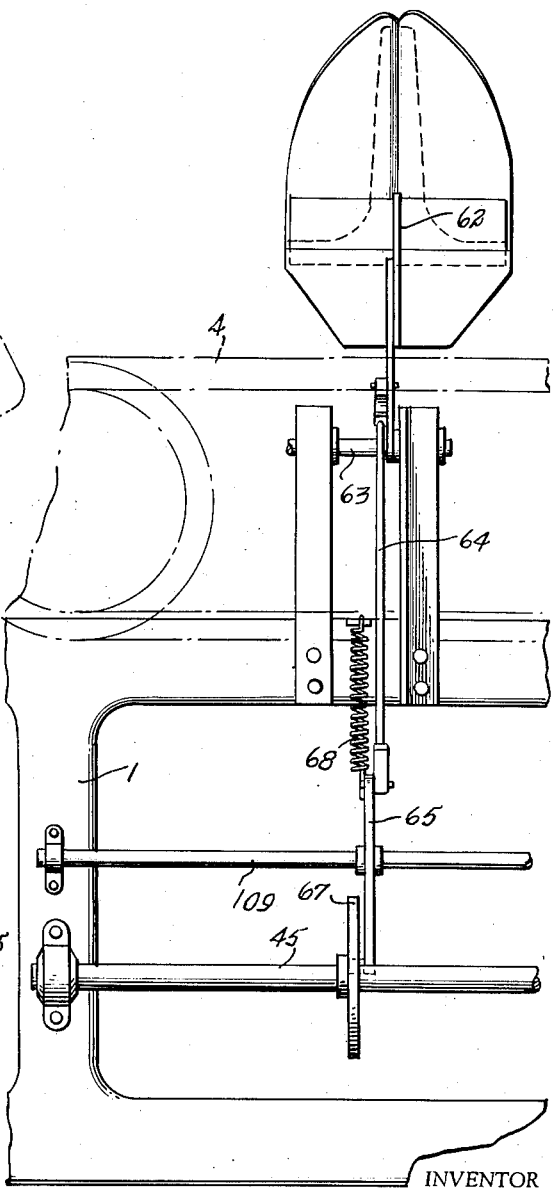

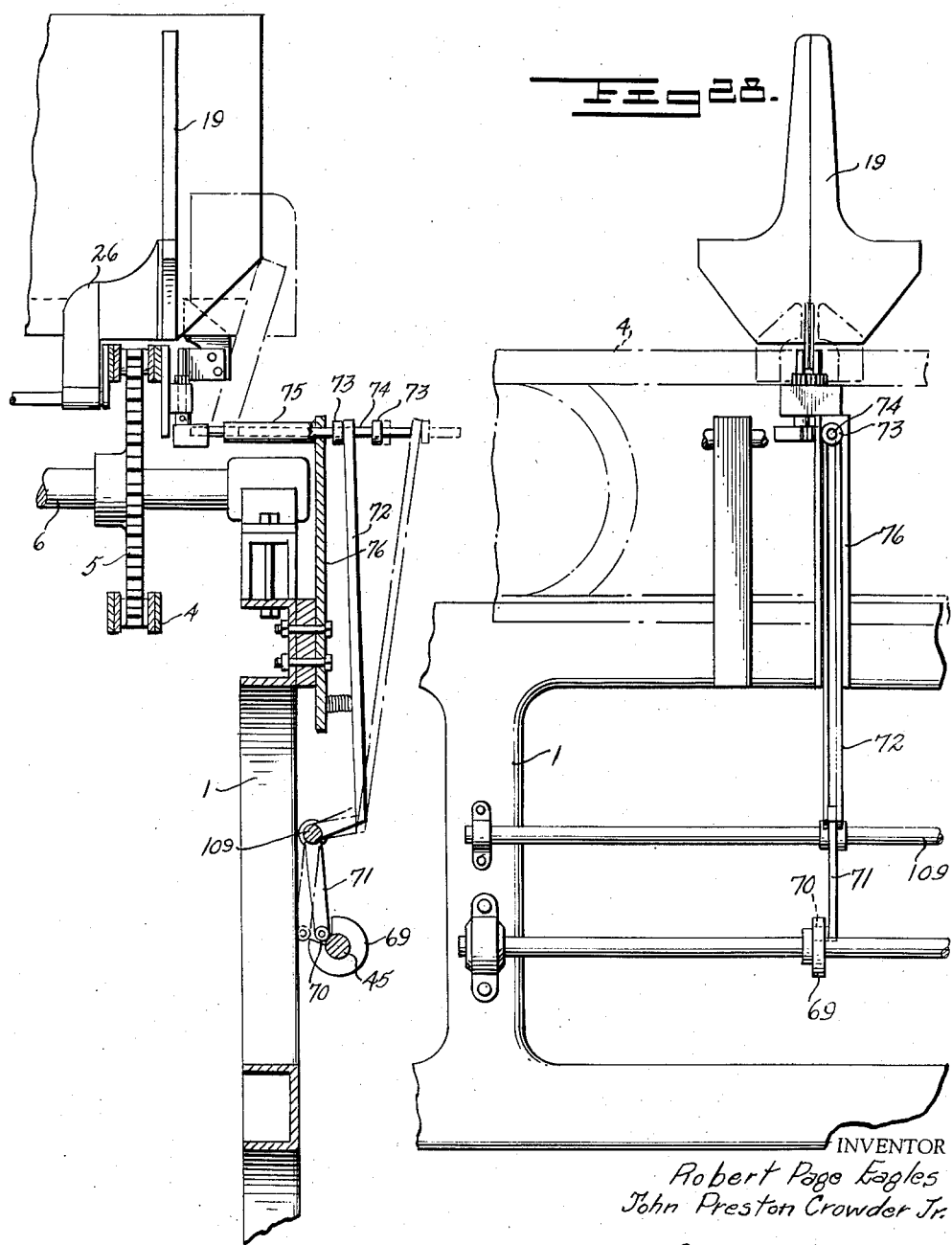

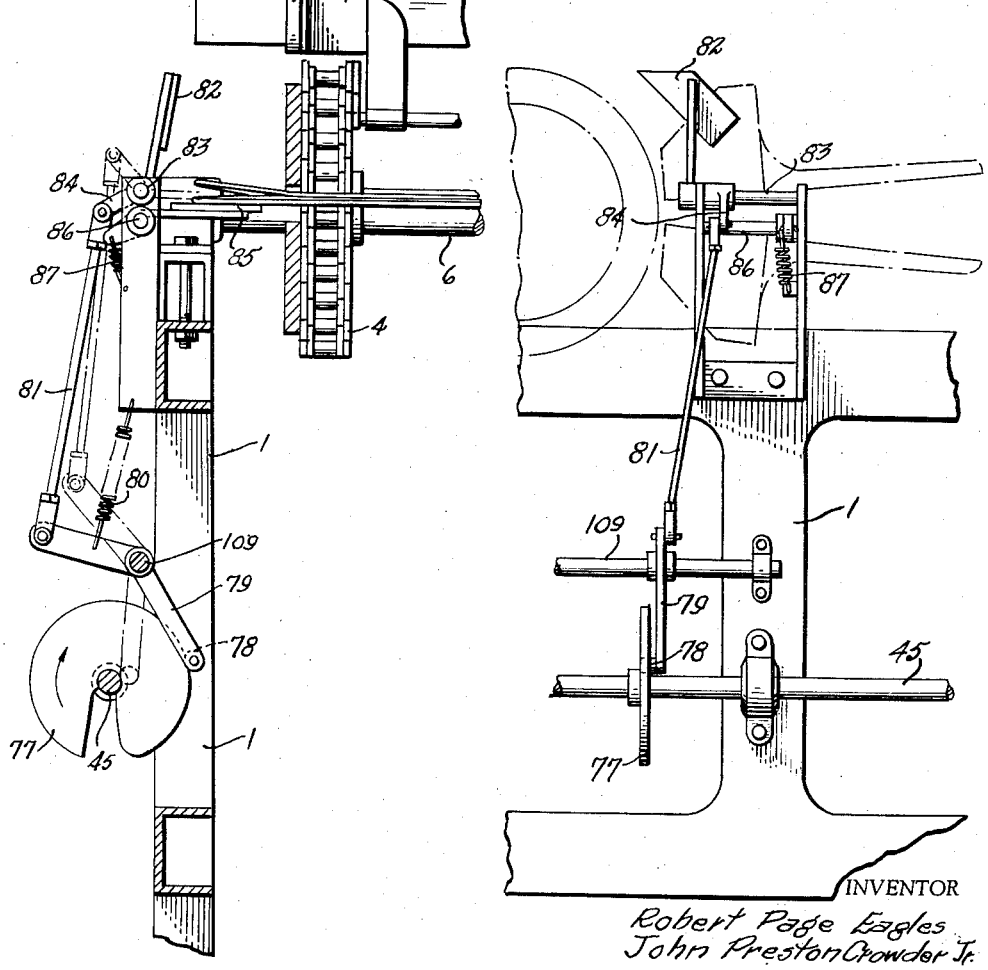

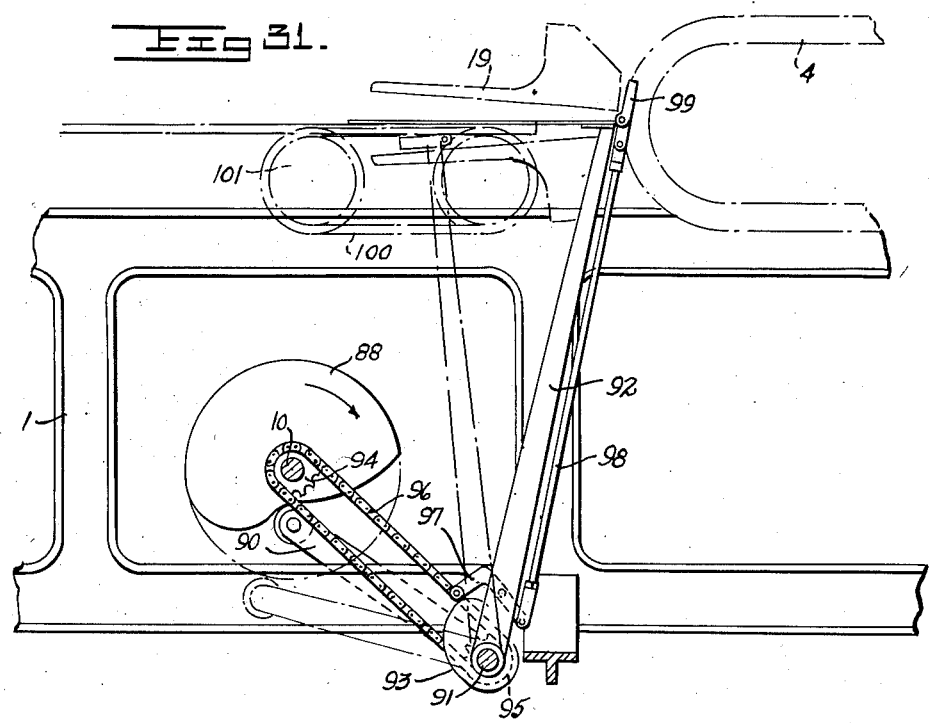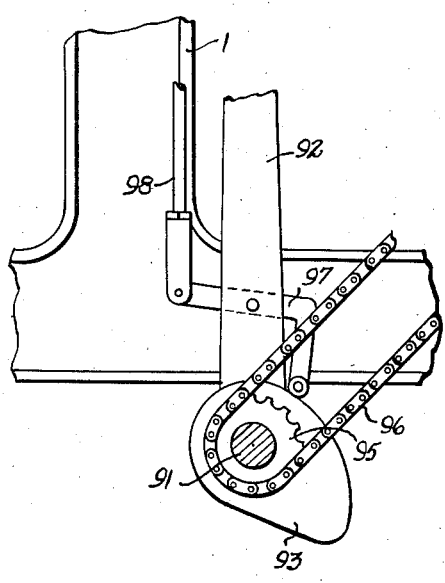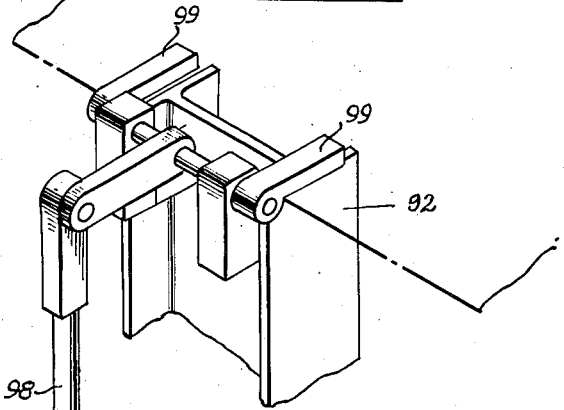

April 15, 1958 R. P. EAGLES ET AL 2,830,504
BAG VALVING AND SLEEVING MACHINE
Filed Jan. 7, 1953 18 Sheets-Sheet 18

INVENTOR
Robert Page Eagles
John Preston Crowder Jr.
BY Pierce, Scheffler + Parker
ATTORNEYS United States Patent Office 2,830,504
Patented Apr. 15, 1958

2,830,504

BAG VALVING AND SLEEVING MACHINE

Robert Page Eagles, Richmond, and John Preston Crowder, Jr., Ellerson, Va., assignors to Virginia-Carolina Chemical Corporation, Richmond, Va., a corporation of Virginia Application January 7, 1953, Serial No. 330,562

5 Claims. (Cl. 93—8)

This invention relates to apparatus for automatically valving and sewing or valving, sleeving and sewing multilayer paper bags in one continuous operation.

The principal object of the invention is to provide a machine for automatically forming the valves, inserting the sleeves and delivering the resulting valved and sleeved blanks to a sewing machine which machine will meet the basic requirements of such a machine i. e. moderate cost, continuous, trouble-free operation, perfection and uniformity of product etc.

A second object is the production of a superior valved sleeved bag. In the manufacture of valved bags with inner sleeves e. g. the multilayer paper bags commonly used for granular fertilizer and similar pourable dry granular materials, the bags are made by first forming a flat tube of the desired size, cutting off sections of the desired length, forming a filling valve at one corner of each section by a folding operation, including the insertion of a valve sleeve, and finally sewing across the ends of each section to close the ends excepting the valve opening. Our invention is concerned with forming the valve, insertion of the valve sleeve, and closure of tube ends by conventional sewing machines in one continuous operation i. e. with a machine which receives the flattened tube section, folds the corner thereof to form the valve and inserts the valve sleeve and delivers the so modified section to a conventional sewing machine.

Figure 2:
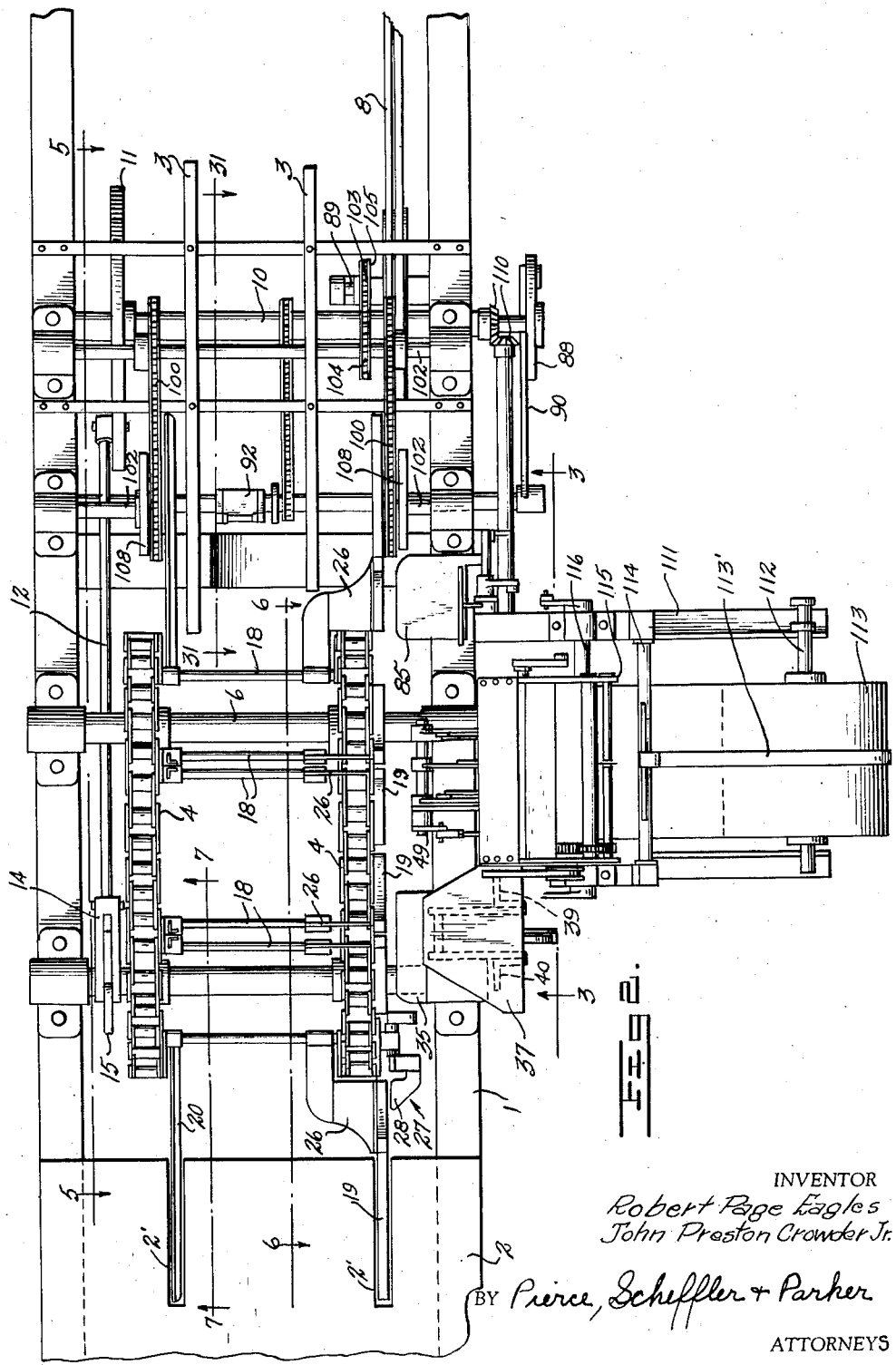
Figure 3:
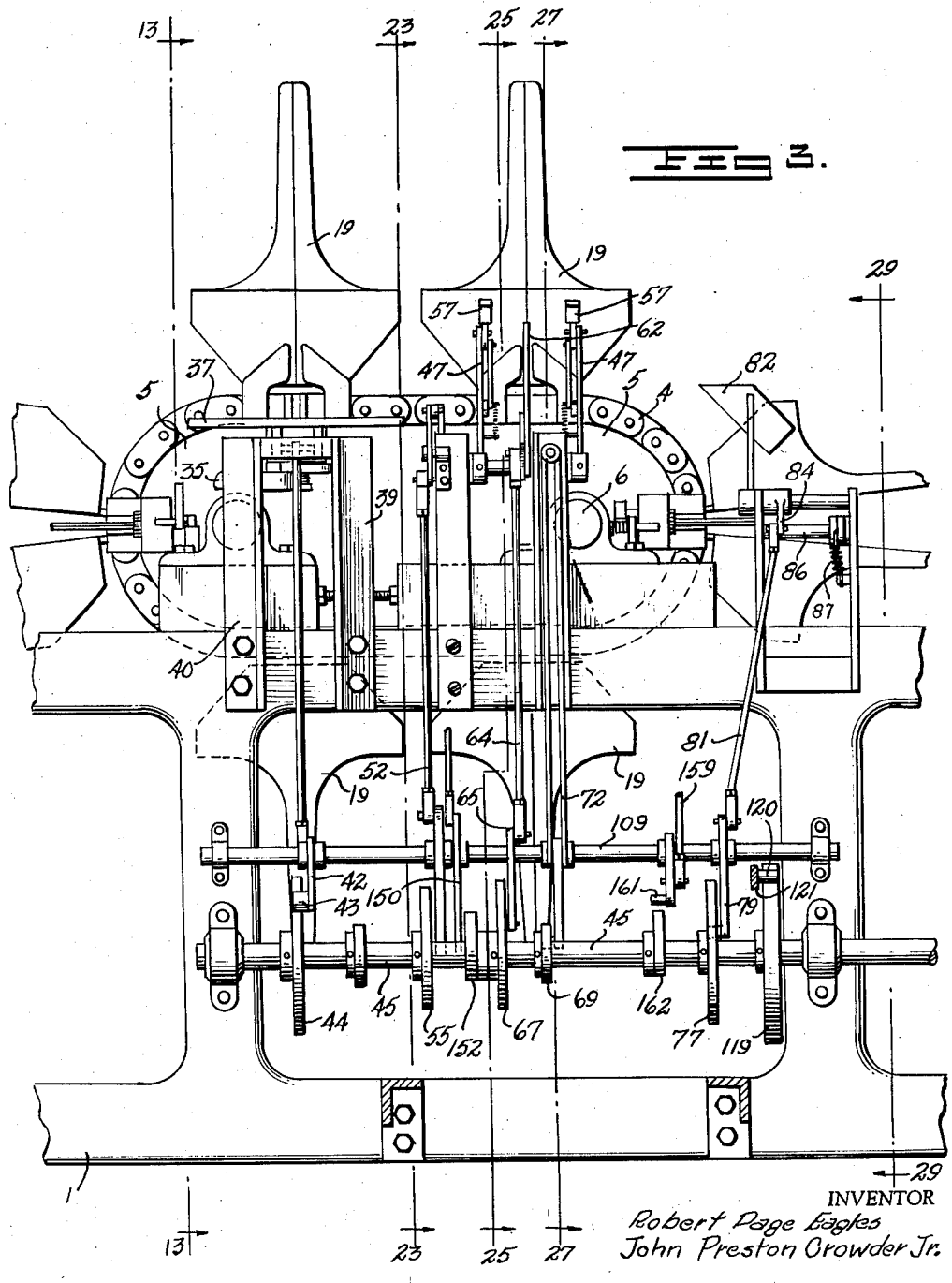
Figure 4:
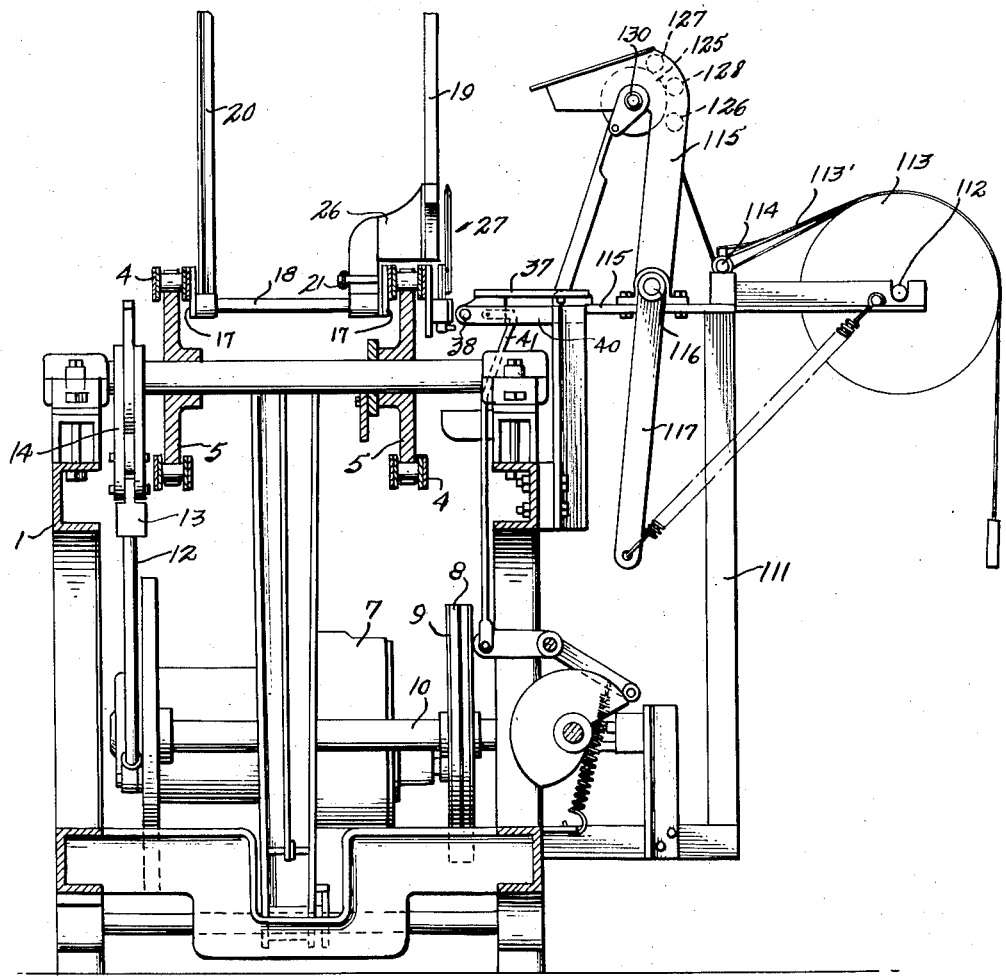

An illustrative embodiment of our invention is shown in the accompanying drawing in which:

Fig. 1 is a side elevation of the machine, viewed from a position at which the bags pass through the machine from left to right, Fig. 2 is, as compared to Fig. 1, an enlarged fragmentary top plan view of the machine, Fig. 3 is an enlarged fragmentary elevation of the machine on the line 3—3 of Fig. 2 i. e. a view of that part of the machine beyond the valve sleeve inserting mechanism, Fig. 4 is a vertical sectional view on the line 4—4 of Fig. 1 showing the valve folding mechanism in retracted position, Fig. 5 is a longitudinal sectional view on the line 5—5 of Fig. 2 showing the driving means for the conveyor mechanism, Fig. 6 is a fragmentary sectional view on the line 6—6 of Fig. 2 showing the bag holding means, Fig. 7 is a fragmentary sectional view on the line 7—7 of Fig. 2 showing the bag holding means on the side opposite that of Fig. 6, Fig. 8 is an enlarged detailed front elevational view of one of the spreaders in a spread position, Fig. 9 is a side elevation at an angle of 90° to the plane of Fig. 8, Fig. 10 is a vertical sectional elevation on the line 10—10 of Fig. 8, Fig. 11 is a top plan view of a spreader shown in Figs. 8, 9 and 10, Fig. 12 is a horizontal sectional view taken on the line 12—12 of Fig. 8 showing the spreader holding latch, Fig. 13 is a fragmentary sectional view taken on the line 13—13 of Fig. 3 showing particularly the valve folding mechanism in its actuated position, Fig. 14 is a side elevation of the parts shown in Fig. 13 at an angle of 90° to the plane thereof, Fig. 15 is a fragmentary sectional view on the line 15—15 of Fig. 1 showing the valve sleeve inserting mechanism in retracted position in full line and in its operative position in broken line and the adhesive applying mechanism in the actuated position in full line and in its retracted position in broken line, Fig. 16 is an enlarged fragmentary sectional view of the adhesive applying means, Fig. 17 is a fragmentary sectional view on the line 17—17 of Fig. 1 showing the valve inserting mechanism in actuated position and the paper cutting operating means in retracted position.

Figure 34:
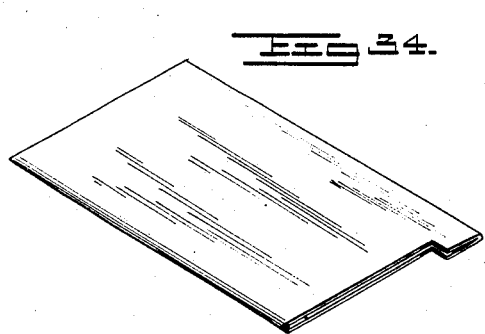
Figure 35:
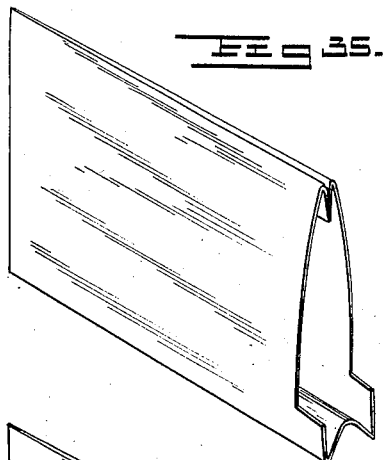
Figure 36:
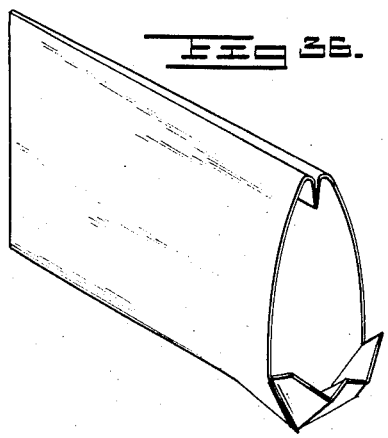
Figure 37:
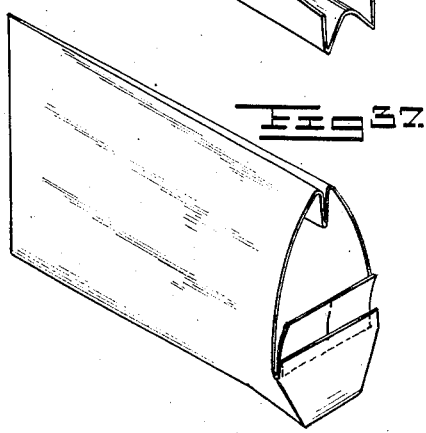
Figure 38:
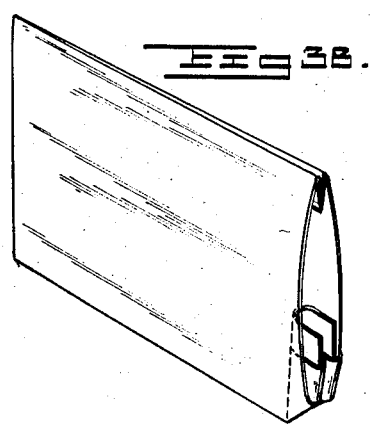
Figure 39:
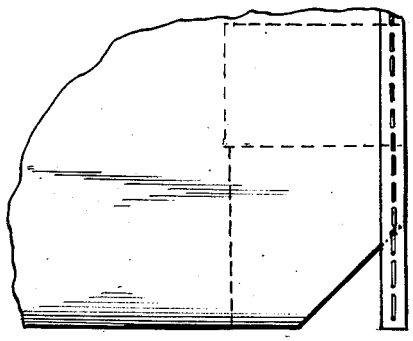

Fig. 18 is a fragmentary sectional view showing the paper cutter actuating means, Fig. 19 is an enlarged fragmentary side elevational view of the sleeve supplying, adhesive applying, cutting and inserting mechanism, Fig. 20 is a sectional view through the sleeve supplying mechanism on the line 20—20 of Fig. 22, Fig. 21 is a sectional view of the sleeve supplying mechanism on the line 21—21 of Fig. 22, Fig. 22 is a rear elevational view of the sleeve supplying and slitting mechanism, Fig. 23 is a fragmentary sectional view on the line 23—23 of Fig. 3 showing the sleeve holding fingers in actuated position in full line and in retracted position in broken line, Fig. 24 is an elevation of the parts shown in Fig. 23 at an angle of 90° to the plane thereof, Fig. 25 is a fragmentary sectional view on the line 25—25 of Fig. 3 showing the creasing mechanism in actuated position in full line and in retracted position in broken line, Fig. 26 is an elevation of the parts shown in Fig. 25 at an angle of 90° to the plane thereof, Fig. 27 is a fragmentary sectional view on the line 27—27 of Fig. 3 showing the spreader release mechanism in the actuated position in full line and in the retracted position in broken line, Fig. 28 is a front elevation at an angle of 90° to the plane of Fig. 27, Fig. 29 is a fragmentary sectional view on the line 29—29 of Fig. 3 showing the crease restoring mechanism in retracted position in full line and in actuated position in broken line, Fig. 30 is a front elevation at an angle of 90° to the plane of Fig. 29, Fig. 31 is a fragmentary vertical sectional view on the line 31—31 of Fig. 2 showing the bag discharge mechanism, Fig. 32 is an enlarged fragmentary view of the lower portion of the bag discharge mechanism showing the discharge gripper actuating means, Fig. 33 is a fragmentary perspective view of the bag discharge mechanism, Figs. 34–39 are views of the bag at different stages of its fabrication, Fig. 34 is a perspective of the bag blank as it is fed into the valve forming machine of the present invention, Fig. 35 is a perspective view of the bag blank with the gusset partly spread apart by the spreader mechanism shown in Fig. 8, Fig. 36 is a perspective view of the bag blank after the gusset has been folded by means of the mechanism shown in Fig. 13, Fig. 37 is a perspective view after the valve sleeve has been inserted, Fig. 38 is a perspective view after the gusset and sleeve have been creased as described in connection with Fig. 25, Fig. 39 is an enlarged fragmentary view of the valved corner of the bag after it has been sewn.

In general the machine comprises a conveyor consisting of a pair of spaced apart, parallel continuous sprocket chains carried on toothed wheels and carrying six pairs of bag blank holding fingers which receive the bag blanks and carry them from station to station where the folding operations and insertion of the sleeve are performed. Each pair of holding fingers stops six times in making a complete circuit and these stops will be referred to hereinafter as stations 1 to 6 marked S1 to S6 on the drawing, starting with the station at which the blanks are inserted in the holding fingers. Cooperating with each pair of holding fingers is a spreader which opens the bellows fold or gusset of the blank as it moves between stations 1 and 2 and travels around the circuit with the holding fingers. A folding or creasing plate is positioned at station 2 and moves from the retracted position into contact with the spread gusset and back to its retracted position while the blank is held at station 2. At station 3 first the sleeve is inserted, second a pair of sleeve gripping fingers engage the gusset and the sleeve to hold the sleeve in its inserted position while the inserting mechanism is retracted and third a creasing plate engages the middle longitudinal crease in the gusset as the holding fingers and the spreader are retracted. At the fourth station a recreasing plate presses down briefly on the folded corner of the blank and then the blank is discharged to the sewing machine. The bag blank holding fingers then travel successively from station 4 through inactive stations 5 and 6 back to station 1 where the described procedure is repeated.

The sleeve inserting mechanism, as indicated above, is positioned at station 3. It advances a continuous strip of paper, intermittently slits the paper down the middle, applies adhesive along the forward edge, moves forward to insert the adhesive coated edge of the strip into the folded corner of the bag blank, cuts off a suitable length of the strip and leaves the cut-off section with the bag blank and returns to its starting position.

It may be noted that the sewing machine closes the two ends of the blank leaving the diagonal edges of the valve (see Fig. 39) free for the insertion of a filling tube. It is noted further that the bag blank as it is supplied to the valve forming machine of the present invention consists of two oblong flat side walls connected along their longitudinal edges by bellows folds or gussets and an oblong projection or lip at one corner. The material of the gussets which connects the edges of the side walls will be referred to hereinafter as the gusset.

Referring to the drawings 1 is the frame of the machine and 2 is a table at the left hand end of the frame as seen in Fig. 1 which serves to support a pile of bag blanks from which they are fed singly by hand to the holding fingers. Table 2 is provided with slots 2' for the passage of the holding fingers therethrough. A table or grid 3 at the right hand end of the frame receives the processed blanks for delivery to the sewing machine (not shown). This table 3 also has openings through which the holding fingers pass.

The sprocket chains 4, 4 are carried on the four sprockets 5, 5, 5, 5, on the cross shafts 6, 6. Chains 4, 4 are moved intermittently to advance the parts carried by them i. e. the holding fingers and spreaders, from station to station by the motor 7 through the drive belt 8, the pulley 9 on the shaft 10, the crank wheel 11 on the shaft 10, the connecting rod 12, 13, 14, the ratchet 15 which is pivoted on the portion 14 of the rod 12, 13, 14 and the ratchet wheel 16 on one of the shafts 6. Parts 12 and 13 of the connecting rod are at an angle to each other to provide clearance. The ratchet 15 may be held out of contact with the ratchet wheel 16 to interrupt the stepwise movement of the chains 4, 4 and the associated parts as will be described below.

The chains 4, 4 carry plates 17 which rotatably support six pairs of cross shafts 18, 18 which in turn carry six pairs of front bag blank holding fingers 19 and six pairs of rear bag blank holding fingers 20. Holding fingers 19 for convenience may be described as being duck bill shaped i. e. they have a broad base which provides a working surface for the manipulation of the corner of the bag blank while it is being creased and folded to form the valve. This working surface preferably but not necessarily is covered with a layer of rubber or other suitable cushioning material which is not shown in the drawings. The two parts of each pair of holding fingers 19 are connected by a coiled spring 21 which tends to pull them together. One of the two parts of each pair of holding fingers 19 has a cam follower 22 which engages the stationary cams 23 and 24 to rotate the associated cross shafts 18, 18 and open the holding fingers at stations 1 and 4. As appears in Fig. 7 the pairs of cross shafts 18, 18 are geared together by the pinions 25, 25 so that as one shaft is rotated in one direction by the cam 23 or the cam 24 and the cam follower 22 the other shaft is rotated in the opposite direction, to open the fingers. Holding fingers 20 are of course opened and closed simultaneously with the holding fingers 19.

It is noted that holding fingers 19 include the curved plates 26 (see Figs. 2 and 4) which extend outwardly and forwardly from their connections to the cross shafts 18 so as to position the broad bases and fingers above and in front of the adjacent chain 4 where they are in position to cooperate with the mechanisms which act upon the bag blank to form the valves.

As the holding fingers approach station 1 from station 6 they open, receive a bag blank and snap back together. Each blank is placed in the holding fingers so that its front end protrudes a suitable distance in front of the fingers 19 and its corner in which the valve is to be formed i. e. the corner having the lip, is adjacent the chain 4 and the spreader mechanism is positioned within the gusset of the blank.

The first operation on the bag blank after it has been grasped by the holding fingers 19 and 20 at station 1 occurs as the blank moves from station 1 to station 2. This action is the the opening of the lower gusset at that portion of the end of the blank which extends forwardly of the front fingers 19. As the blank is moved from station 1 to station 2 the two wings 28, 28 of the spreader 27 are rotated to operative position as follows: The two wings 28, 28 of the spreader 27 are carried by parallel shafts 29, 29 which are rotatably supported by the block 30, which in turn is carried on the plate 31 on the front chain 4. Shafts 29, 29 are geared together by the pinion 32, 32 and one of the shafts 29 carries the coiled spring 33 secured thereto and to the block 30 and tensioned to turn the shafts 29, 29 to normally hold the wings 28, 28 in their inoperative position as shown for instance at position S1 in Fig. 1. One of the shafts 29, i. e. the lower end of the shaft 29 on the left as seen in Fig. 8 carries the arm or cam follower 34 which cooperates with the stationary cam 35 to rotate the shafts 29, 29 and spread the wings 28, 28.

At this point the latch 36 is rotated clockwise as seen in Fig. 12 by a spring 36' and engages a depression in one of the shafts 29, 29 and locks the spreader 27 in open position. Thus the bag blank arrives at station 2 with the spreader 27 locked in open position.

At station 2 the folding or creasing plate 37 is operated to bend the edge of the gusset against the flat base of the fingers 19 as follows: Plate 37 is hinged at 38 to the support 39, 40 which latter extends forwardly and downwardly from the plate 37 to the front of the frame 1 (see Fig. 13). The hub of the plate 37 is connected to the link 41 which in turn is connected to the bell crank 42 rotatable on the shaft 109 and having the cam follower 43 which cooperates with the cam 44 on the rotating shaft 45. 46 is a spring for returning the parts 37, 41, 43 to retracted position. Thus, due to the shape of the cam 44, plate 37 snaps to its actuated position shown in Fig. 13 and bends the spread gusset against the base of the fingers 19 and then returns to its retracted or rest position, while the bag blank remains at station 2. It is noted that the action of the plate 37 forms the crease which extends across the gusset as well as the two diagonal creases as seen in Fig. 37.

The chains 4, 4 are then moved by the ratchet 15 to deliver the bag blank to station 3 at which the following operations occur: the sleeve is inserted, sleeve retaining fingers 47, 47 are actuated to hold the sleeve in place while the sleeve inserting mechanism is retracted, creasing plate 62 is applied and then the retaining fingers 47, 47 are retracted, the spreader 27 is released to return to its retracted position and the creasing plate is retracted, these operations occurring in quick succession or practically simultaneously.

The sleeve forming and inserting mechanism will be described in detail below. For the present it may be described simply as being a means for inserting the freshly adhesive coated edge of a partially bisected rectangular sheet of paper into position to be adhesively attached across the entire width of the inner or rear surface of the inturned edge of the gusset and the adjacent portions of the side walls between the diagonal creases referred to above. When the lip of the inserting mechanism carrying the sleeve is positioned in the pocket formed by the gusset and the adjacent portions of the side walls of the bag blank (see Figs. 15 and 36) fingers 47 move forward to press the gusset against that portion of the bag blank adjacent the base of the holding fingers 19 with the sleeve between them and hold the sleeve while the lip of the inserting mechanism is withdrawn.

The operation of the fingers 47 is as follows: Referring to Figs. 23 and 24 fingers 47 are carried by the rotatable shaft 48 which is rotatable by means of the crank 49. Crank 49 is connected by the adjustable link 50 to the bell crank 51 which in turn is connected by the link 52 to the lever 53 rotatably mounted on the shaft 109. The cam follower 54 on lever 53 cooperates with cam 55 on shaft 45 and with the spring 56 to move the fingers forward to actuated position and return them to rest position. In order to provide a flexible gripping action of the fingers 47 they are provided with rubber tips 57 carried on the ends of the short levers 58 which latter are connected through the links 59 and 60 to points at some distance from the ends of the fingers and the springs 61 serve to urge the rubber tips forwardly with a gentle pressure. Thus, as shown in Fig. 23 the finger tips 57 engage the sleeve adjacent the edge of the inserting lip and retain the sleeve while the inserting lip is withdrawn.

After fingers 47 have engaged the gusset with the sleeve in position the creasing plate is actuated as follows: Referring to Figs. 25 and 26 the plate 62 is mounted on the rotatable shaft 63 and is connected directly by the link 64 to the lever 65 on the shaft 109. The lever 65 carries the cam follower 66 which cooperates with the cam 67 on the rotating shaft 45 and the spring 68 to bring the edge of the plate 62 into contact with the gusset at the central longitudinal crease thereof, hold it in this position for a short time and then return the plate to its retracted position.

When the creaser plate 62 has engaged the gusset the fingers 47 are retracted and the spreader 27 is released to return to its rest position. This last operation occurs as follows: Referring to Figs. 12, 27 and 28, the cam 69 rotating with the shaft 45 cooperates with the cam follower 70 on the bell crank 71 on the shaft 109 to shift the arm 72 the free end of which strikes the stops 73 on the rod 74 to shift the same forwardly and rearwardly in its supporting sleeve 75. Sleeve 75 is carried by the plate 76 secured to the frame 1. When the rod 74 is kicked forward it strikes the free end of the latch 36 thereby releasing the spreader, the wings thereof being returned to rest position by the tension of the spring 33.

Upon release of the gusset by the spreader 27, the fingers 47 and the plate 62 the resilience of the bag material tends to return the protruding edges of the flat side walls of the bag blank and the walls of the gusset to their parallel relationship.

At this point chains 4, 4 are actuated by the cam 15 to move the holding fingers 19 and 20 forward to station 4. In the movement from station 3 to station 4 the cam follower 22 engages the cam 24 and opens the holding fingers.

The bellows fold with the folded-in corner and sleeve, forming the valve, remain somewhat expanded, i. e. the resilience of the bag material does not suffice to return the side walls and gusset walls to their original flat condition. To flatten the valve corner and thus prepare the blank for the application of a strengthening strip and sewing the following mechanism is actuated. Referring to Figs. 29 and 30 the cam 77 rotating on the shaft 45 cooperates with the cam follower 78 on one end of the bell crank 79 on the shaft 109 and with the spring 80, through the link 81 to cause the plate 82 to strike the corner of the bag blank and flatten it. Plate 82 is rotatably mounted on the shaft 83 and has the lever arm 84 which is connected to the link 81. The anvil surface for this operation is provided by the plate 85 pivotally mounted on the shaft 86 and flexibly held in position by the spring 87.

The holding fingers 19 and 20 have now been opened and the valve corner flattened and the next operation is to remove the blank from the holding fingers and deliver it to the sewing machine.

We have found that it is not sufficient simply to open the holding fingers to release the bag blank but that in order to move the bag blank out of the holding fingers and keep it in transverse alignment for delivery to the sewing machine the following operations are necessary. First the bag blank is positively gripped and moved forward a short distance while being held in transverse alignment until it is fully released from frictional contact with the spreader 27. This is accomplished as follows: Referring to Figs. 31, 32 and 33 the cam 88 rotating with the cross shaft 89 cooperates with a cam follower on the end of the arm 90 secured to the shaft 91 to swing the arm 92, also secured to the shaft 91, from its full line to its broken line position shown in Fig 31. At the same time the cam 93, which is rotated on the shaft 91 by the sprocket 94 on shaft 89, sprocket 95 secured to the cam 93 and the chain 96, cooperate with the cam follower and bell crank 97 and link 98 to cause the fingers 99 to grip the edge of the bag blank between said fingers 99 and the preferably rubber covered top surface of the arm 92. Thus the bag blank is positively held in transverse position while it is being removed from the holding fingers 19 and 20. The fingers 99 then release the bag blank and return to their full line position shown in Fig. 31 and at this point the bag blank is engaged and moved forward toward and into the sewing machine as follows: Sprocket chains 100 (see Fig. 5) are carried on sprockets 101 on the cross shafts 102 one of which is rotated by the chain 103 which is carried between sprocket 104 on shaft 102 and sprocket 105 on shaft 89 and engages a sprocket 106 on shaft 10. Chains 100 carry the angular members 107. As the chains 100 move one arm of each member 107 engages the cam plate 108 turning the member so that the other arm thereof extends vertically and as the upper spans of the chains move forward these arms engage the bag blank and push it forward into the draw rollers of the sewing machine. Since the draw rollers of the sewing machine travel at a slower rate than the chains 100 it is necessary for the members 107 to disengage the bag at about the same moment that the draw rolls take over the movement of the bag blank. This mechanism permits the handling of bag blanks of different sizes, it being necessary only to adjust the position of the cam plate 108.

Shaft 45 is driven from the shaft 10 by the bevel gears 110, 110.

The sleeve inserting mechanism is mounted on an auxiliary frame 111 attached to the main frame 1 in front of station 3. The moving parts are driven by the shaft 45. The frame 111 rotatably supports the cross shaft 112 which carries a roll of paper 113 and the guide roller 114 which delivers the strip of paper to the tilting head of the inserting mechanism. 113' is a brake for preventing the paper roll 113 from running freely and releasing more paper than is needed. The tilting head of the inserting mechanism comprises the two side plates 115 secured to the cross shaft 116 which is rotatably supported by the frame 111. Lever 117 secured to the shaft 116 and the spring 118 tend to tilt the head forward to insert the sleeve into the bag blank while the cam 119 on the rotating shaft 45, the cam follower 120 on the lever 121 pivoted at 122, the connecting link 123 secured to the lever 121 and the arm 124 secured to the shaft 116 periodically return the tilting head to its retracted position.

The side plates 115 support the rubber surfaced drum 125, the contacting rollers 126 and 127 which may be rubber surfaced or not and the cross shaft 128 which carries the cutting wheel 129. The drum 125 is rubber surfaced excepting a narrow band adjacent the middle thereof where it cooperates with the cutting wheel 129. Drum 125 is on a cross shaft 130 on which is the toothed wheel 131 which meshes with the toothed wheels 132, 133 and 134 on the shafts 128 and the shafts of rollers 126 and 127. It is noted that the cutting wheel 129 has two non cutting portions 135. The strip of paper is fed from the roll 113 as follows. As the tilting head moves forward under the influence of the spring 118 and the cam 119 it carries the strip of paper forward with it and draws sufficient paper from the roll 113 to permit its forward movement. Rollers 125, 126 and 127 do not rotate during this forward movement of the head. On the return movement of the head the drum 125, and rollers 126 and 127 are rotated to advance the paper strip through the head by the amount drawn from the roll 113 on its forward movement. The rotation of the drum 125 and the rollers 126 and 127 is effected by the rod 136 pivotally secured at one end to the frame 111 and at its other end to the crank 137 which latter has a ratchet connection with the shaft 130 permitting it to rotate the latter counterclockwise as seen in Fig. 19 but not in the reverse direction. Reverse rotation of the shaft 130 and of the drum 125, rollers 126 and 127 and the shaft 128 is prevented by the ratchet wheel 138 on the shaft 130 and the ratchet 139. As the strip of paper moves forward through the tilting head it is slit down the middle excepting the uncut portions left by the noncutting portions 135 of the cutting wheel 129. Each forward movement of the tilting head draws sufficient paper from the roll to form a sleeve of the desired length and the reverse movement feeds this amount of paper through the tilting head.

The strip of paper passes forward from the roller 113 under the guide roller 114 and between the drum 125 and the rollers 126 and 127 and passes along under the plates 140 and 141, being guided by the filler block 142 under the plate 140 and by the wire fingers 143 under the plate 141. Adhesive is applied to the leading edge of the paper strip as follows:

The adhesive fountain 144 (see Figs. 15, 16, 17 and 18) is supplied with liquid adhesive through a flexible tube (not shown). It is moved from its retracted position shown in full line in Fig. 19 and in dotted line in Fig. 20 to its adhesive applying position shown in full line in Fig. 20 as follows. It is carried on one end of the lever 145 which is pivoted at 146 and the other end of which is connected to the rod 147. Rod 147 is connected at its other end to the lever 148 which is pivotally attached to the side plate 115 and is attached to the rod 149. Rod 149 is attached to the bell crank 150, the cam follower 151 of which cooperates with the cam 152 on the shaft 45. It is noted that adhesive is applied to the leading edge of the paper strip just before the tilting head of the sleeve inserting unit moves forward.

After the tilting head of the sleeve inserting unit has moved forward to the position shown in Fig. 17 the sleeve is cut off from the paper strip by the knife 153 which is shown in its advanced or cutting position in Fig. 21. The knife 153 and the front edge of the plate 140 constitute shears. The knife blade 153 carries a rack 154 which meshes with the pinion 155 which is rotated to actuate the knife by means of the arm 156, link 157, lever 158, rod 159, lever 160, cam follower 161 and cam 162.

As stated above the knife 129 slits the strip of paper fed from the roll 113 down the middle excepting two relatively short lengths (one about ½ inch in length and one about ⅛ inch in length) left by the inactive portions 135 of the knife 129. After a sleeve is cut off by the knife 153 it is in two sections held together only by the short uncut lengths. After the sleeve has been put in place in the valve one end which contains the longer uncut length is of course adhesively attached to the bag. The free ends of the two sections of the sleeve are held together only by the short uncut length but this readily tears when the filling nozzle is inserted into the valve to fill the bag.

It will now be understood that the sleeve forming mechanism measures off a suitable length of paper strip and in effect divides it into two parallel sections, applies adhesive to the forward edges of the sections, inserts them into the valve of the bag, severs the two sections from the strip and returns to its starting position, the two valve sections being caught and held in the valve by the fingers 47.

Several features of our machine have not been illustrated because of their conventional nature. For instance an electric switch is provided at a convenient point or if desired switches may be provided at several points for starting and stopping the whole machine. A start and stop switch generally is provided within reach of the person who stands in front of the table 2 and feeds the bag blanks from this table into the machine. We have also arranged by means of an electric eye pointed at the table 3 where the bag blanks periodically appear, said electric eye being in an electric circuit controlled by a cam operated switch timed to open and close the circuit in synchronism with the movement of the bags over the table 3 so that in the event that a bag does not appear in front of the electric eye on schedule a solenoid operated switch will stop the operation of the machine. Specifically the actuation of the electric eye actuates one solenoid which holds the ratchet 15 out of contact with the ratchet wheel 16 thus stopping the movement of the holding fingers 19 and 20 from station to station and actuates another solenoid which serves to hold the lever 117 against movement by the spring 118 thus stopping the feeding of sleeves. As is evident it is possible independently to hold the arm 117 or the ratchet 15 to stop either the forward movement of the bag blanks or the feeding of sleeves.

It is of course within the scope of our invention to provide means for automatically feeding bag blanks into the grippers at station 1 and it is further within the scope of our invention to deliver the bag blanks at station 4 into a sewing machine operating in synchronism with the valve forming machine or to simply deliver them to a receiver from which they may be delivered manually to a sewing machine.

The machine may be operated to produce valved bags without sleeves by simply inactivating the sleeve inserting mechanism e. g. by disconnecting the spring 118.

We appreciate that the apparatus illustrated and described is capable of wide variation within the skill of a mechanic without departing from the principles of our invention.

Rear holding fingers 20 might be omitted or substituted by other means for carrying the rear ends of the bag blanks. Only the front pair of holding fingers 19 are essential and these might be carried on a single chain or equivalent conveying means. Even the form of the front holding fingers 19 might be modified e. g. they might be substituted by simple fingers like fingers 20 and by an associated separate plate serving as a substitute for the broad bases of the fingers 19. The shape of the wings of the spreader 27 are capable of considerable variation and other equivalent means might be provided for spreading the gusset at the lower front corner of the bag blank. In the same way mechanical equivalents might be substituted for the creaser 37, the fingers 47, the creaser 62 and the spreader release mechanism 69—75. Similarly equivalent mechanism might be substituted for the bag blank release mechanism 88—99, for the bag blank conveying mechanism 100—108 and the valve recreasing mechanism 77—87. Once these mechanisms and their functions have been disclosed equivalents and substitutes therefor readily may be devised.

We wish particularly to note that many of the moving parts of the machine are operated by means of peripheral cams and springs and that these might be replaced in most instances by face cams.

We claim:

1. Apparatus for forming a sleeved valve in a flat tubular bag blank having parallel, flat side walls, at least one open end and a bellows fold uniting at least two adjacent edges of said side walls, said apparatus comprising means for holding said blank along a line parallel to and spaced apart from said open end, means for spreading the free end of said bellows fold substantially to a plane perpendicular to the plane of said flat side walls and thereby spreading apart the contiguous edge portions of said side walls, a plate movable to bend said free end portions of said bellows fold and the contiguous portions of the side walls inwardly through an angle of about 90° to a second plane perpendicular to the plane of said side walls, means for inserting an adhesive bearing edge of a sleeve into the space between said inwardly bent ends of the bellows fold and the opposed spread edge portions of the side walls, means for pressing said inwardly bent ends, said sleeve and said spread edge portions together and thereafter releasing the same, means for releasing said spreading means, means for holding the middle crease of said bellows fold while said spread side walls and the spread ends of said bellows fold return at least partly to their original parallel relationship, means for flattening the corner of said bag blank including said end portions of the bellows fold, means for releasing said holding means, means for gripping said bag blank while said holding means is being released, thereby maintaining the longitudinal alignment thereof and means for moving said blank away from said gripping means.

2. A bag valving machine comprising a pair of fingers adapted to successively close and open, to successively grip and release a bag blank, means for moving said fingers in a fixed path, means in said path for opening said fingers, means associated with said fingers for restoring the same to closed position when released by said opening means, a gusset spreader mounted in fixed relationship to said fingers and movable therewith in said fixed path, means in said path for spreading the wings of said spreader, means associated with said spreader for locking the wings in spread position, means in said path for releasing said locking means and means associated with said spreader for returning said wings to their closed positions.

3. A bag valving machine comprising a conveyor movable in a fixed path, bag blank holding means mounted on and movable with said conveyor, a spreader mounted on said conveyor and movable therewith and adapted to spread the gusset of a bag blank held by said holding means into a plane perpendicular to the plane of the bag blank and parallel to the side edges thereof, means occupying a fixed position with respect to said conveyor for actuating said spreader to spread said gusset, means associated with said spreader for locking the same in spread position, a creaser plate supported in fixed position with respect to said conveyor, means for moving said creaser plate from its rest position to a position perpendicular to the side edges of the bag blank and for returning the creaser plate to rest position, means occupying a fixed position with respect to said conveyor for returning said spreader to rest position, and a second creaser plate occupying a fixed position with respect to said conveyor and movable to engage the middle crease of said gusset, means for moving said second creaser plate into contact with said middle crease and for returning it to rest position, means for restoring the walls of the gusset and the adjacent portions of the side walls of the bag blank to substantially parallel relationship, a conveyor, means for gripping the bag blank and moving it, while maintaining its alignment, out of contact with said bag blank holding means and said spreader and delivering the same to said conveyor and draw rolls positioned to receive the bag blank delivered thereto by said conveyor, said conveyor comprising cam actuated means for engaging said bag blank deposited thereon and for disengaging the same as the bag blank arrives at said draw rolls.

4. A bag valving machine comprising bag blank holding fingers and a gusset spreader associated therewith, and means for moving said fingers and said spreader in a fixed path, said spreader comprising spreader wings mounted on parallel rotatable shafts, meshing pinions on said shafts, a cam follower on one of said shafts, a cam surface in the path of said cam follower and adapted to move said wings to open relationship, spring means tensioned to rotate said shafts to bring said wings to their closed, parallel relationship, a latch adapted to hold said wings in open, spread relationship, and means in said path for releasing said latch.

5. A bag valving and sleeving machine comprising means for folding the corner of a gusseted bag blank to form a valve and means associated with said valving means for inserting a sleeve in said valve, said means for inserting a sleeve consisting of a tiltable mechanism comprising rollers for advancing a continuous strip of paper and means for slitting the strip of paper down the middle as the mechanism is tilted rearwardly and means for applying adhesive along the front edge of said strip of paper and means for severing a predetermined length of said strip as the mechanism is tilted forwardly, said rollers, slitting means, means for applying adhesive and means for severing being actuated by the tilting movement of said mechanism and means for tilting said mechanism.

References Cited in the file of this patent

UNITED STATES PATENTS

| Number | Name | Date |
|---|---|---|
| 1,650,895 | Kronmiller et al. | Nov. 29, 1927 |
| 1,926,895 | Orr | Sept. 12, 1933 |
| 2,387,274 | Lee | Oct. 23, 1945 |
| 2,442,431 | Peters et al. | June 1, 1948 |
| 2,489,210 | Weeks | Nov. 22, 1949 |
| 2,528,419 | Burroughs | Oct. 31, 1950 |
| 2,590,568 | Peters et al. | Mar. 25, 1952 |
| 2,643,588 | Burroughs | June 30, 1953 |
| 2,708,392 | Orr | May 17, 1955 |